(12) United States Patent
Baker

(10) Patent No.: US 9,515,516 B2
(45) Date of Patent: Dec. 6, 2016

(54) PORTABLE POWER STATION SYSTEM

(71) Applicant: Jeramy Baker, Topeka, KS (US)

(72) Inventor: Jeramy Baker, Topeka, KS (US)

(*) Notice: Subject to any disclaimer, the term of this patent is extended or adjusted under 35 U.S.C. 154(b) by 541 days.

(21) Appl. No.: 14/044,905

(22) Filed: Oct. 3, 2013

(65) Prior Publication Data

US 2015/0097428 A1    Apr. 9, 2015

(51) Int. Cl.
| | |
|---|---|
| H02J 3/02 | (2006.01) |
| H02J 7/32 | (2006.01) |
| H02J 7/34 | (2006.01) |
| H02J 7/35 | (2006.01) |
| H02J 7/00 | (2006.01) |

(52) U.S. Cl.
CPC ............ *H02J 7/32* (2013.01); *H02J 7/345* (2013.01); *H02J 7/35* (2013.01); *H02J 7/0055* (2013.01); *Y02E 10/766* (2013.01); *Y10T 307/336* (2015.04)

(58) Field of Classification Search
CPC .... Y10T 307/336; H02J 7/0055; Y02E 10/766
USPC .......................................................... 307/22
See application file for complete search history.

(56) References Cited

U.S. PATENT DOCUMENTS

| | | | |
|---|---|---|---|
| 8,254,090 B2 | 8/2012 | Prax et al. | |
| 8,269,374 B2 | 9/2012 | De Caires | |
| 8,295,033 B2 | 10/2012 | Van Straten | |
| 8,362,648 B2 | 1/2013 | Matsui et al. | |
| 8,489,248 B2 * | 7/2013 | Carson | H02P 9/04 363/142 |
| 2007/0252435 A1 * | 11/2007 | Coe | H02J 7/1423 307/10.1 |
| 2009/0128085 A1 | 5/2009 | Yang | |
| 2011/0146751 A1 * | 6/2011 | McGuire | F03D 1/005 136/245 |
| 2013/0043826 A1 | 2/2013 | Workman et al. | |
| 2013/0099721 A1 | 4/2013 | Azzam et al. | |
| 2013/0106191 A1 | 5/2013 | Iovino et al. | |
| 2014/0098525 A1 * | 4/2014 | Bennett | H02J 7/0052 362/183 |
| 2015/0091392 A1 * | 4/2015 | Hwang | H02J 7/0045 307/150 |

\* cited by examiner

*Primary Examiner* — Jared Fureman
*Assistant Examiner* — Duc M Pham
(74) *Attorney, Agent, or Firm* — The Keys Law Firm PLLC

(57) ABSTRACT

A portable power station system for providing access to electrical power and mechanical energy in from stored and renewable sources comprising a housing containing a battery, a brushless DC motor, an inverter, a gear system, an AC motor, an alternator, a rectifier, a reservoir capacitor, a charge controller, sequentially connected with the charge controller connected back to the battery. Solar panels and a wind power generator are additionally connected to the charge controller. A plurality of grounds are also provided. The portable power station system works to convert stored energy from the battery into other forms of energy and provide access to the various forms of energy through various discrete outputs accessible from the exterior of the housing. To account for the inevitable energy losses from its operation, the portable power station system utilizes renewable forms of energy to continually introduce additional energy.

18 Claims, 1 Drawing Sheet

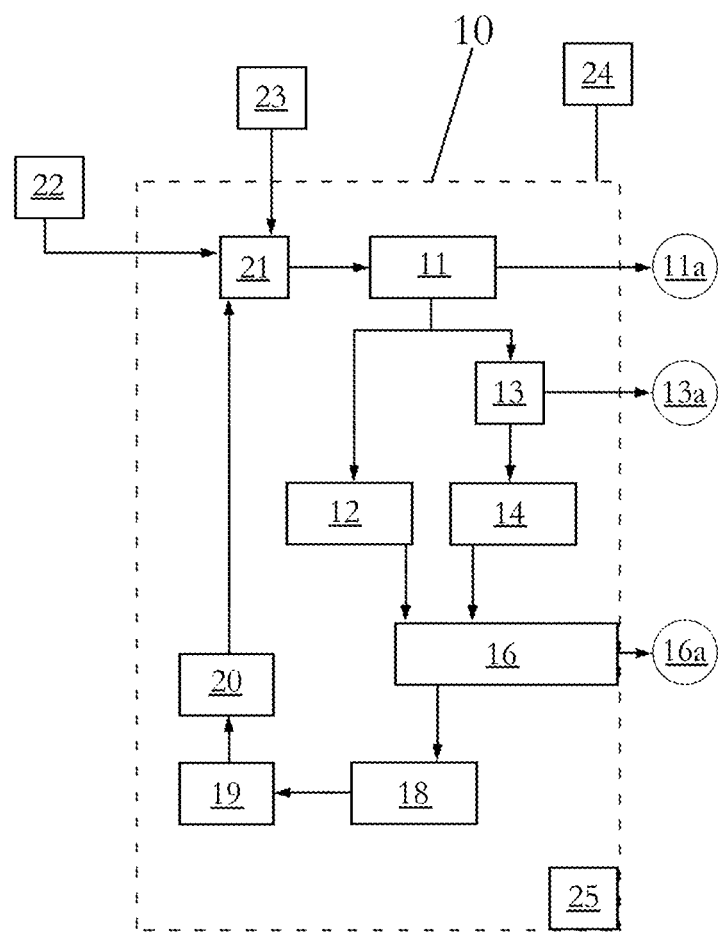

PORTABLE POWER STATION SYSTEM

BACKGROUND OF THE INVENTION

Field of the Invention

This invention relates generally to power systems and, more particularly, to a mobile, self contained electrical power generation and storage system.

Description of the Prior Art

In today's society, many of the most basic daily functions require access to electrical power. Society's ability to provide electrical power from fixed, centralized sources through a traditional electrical grid has continued to develop and evolve in such a manner that in many industrialized nations, constant and ongoing access to electricity is taken for granted under normal conditions. As a result, whenever electrical power is lost, most operations of individuals and of society as a whole tend to come to a halt.

To address the issues created by our extreme reliance on ongoing electrical power, many forms of mobile power generators have been developed for supplying power locally in the event that power from the electrical grid is lost. A problem which still exists, however, is that known mobile power generators are typically tied solely to access to non-renewable resources, such as gasoline, and do not integrate or otherwise make use of both renewable and non-renewable resources. Thus, there remains a need for a portable power station system which incorporates both renewable and non-renewable resources to maximize its electricity generation and storage capabilities. It would be helpful if such a portable power station system was able to provide power in both AC and DC. It would be additionally desirable for such a portable power station system was additionally capable of providing mechanical energy.

The Applicant's invention described herein provides for a power generation system adapted to provide electrical and mechanical power from a mobile assembly. The primary components of Applicant's portable power station system are renewable power generators, batteries/super capacitors, an inverter, an AC motor, a brushless DC motor, and an alternator. When in operation, the portable power station system allows a user to access both AC and DC electrical power generated through a plurality of types of generators. As a result, many of the limitations imposed by prior art power stations are removed.

SUMMARY OF THE INVENTION

A portable power station system for providing access to electrical power and mechanical energy in from stored and renewable sources, such as solar and wind. The portable power station system comprises a housing containing a battery, a brushless DC motor, an inverter, a gear system, an AC motor, an alternator, a rectifier, a reservoir capacitor, a charge controller, sequentially connected with the charge controller connected back to the battery. Solar panels and a wind power generator are additionally connected to the charge controller to provide an input of electrical energy. A plurality of grounds are also provided.

In operation, the components of the portable power station system convert stored energy from the battery into other forms of energy and provide access to the various forms of energy through various discrete outputs accessible from the exterior of the housing. To account for the losses that inevitably occur during such conversion and which result from the user accessible outputs, the portable power station system utilizes renewable forms of energy to continually introduce additional energy.

It is an object of this invention to provide a portable power station system which incorporates both renewable and non-renewable resources to maximize its electricity generation and storage capabilities.

It is another object of this invention to provide a portable power station system which is able to provide power in both AC and DC.

It is yet another object of this invention to provide a portable power station system that is additionally capable of providing mechanical energy.

These and other objects will be apparent to one of skill in the art.

BRIEF DESCRIPTION OF THE DRAWINGS

FIG. 1 is a block diagram of a portable power station system built in accordance with the present invention.

DETAILED DESCRIPTION OF THE INVENTION

Referring now to the drawings and in particular FIG. 1, a portable power station system 10 is shown as 2' by 2' by 2' housing contain a series of sequentially connected internal components, a plurality of connected inputs, and a plurality of output connectors. It is contemplated, however, that the housing used can be of any suitable size. The internal components of the portable power station system 10 include a battery 11 which supplies direct current (DC) electrical energy stored therein to a brushless DC motor 12, an inverter 13, and to an DC power output connector 11a. In another embodiment, a super capacitor is utilized in place of the battery 11.

The brushless DC motor 12 receives the DC electrical energy and uses it to supply mechanical energy to a mechanical system 16, defined in the as a series of gears. In an alternate embodiment, a series of pulleys can be used in the mechanical system 16.

The inverter 12 receives the DC electrical energy, converts it to alternating current (AC) electrical energy, and supplies the AC electrical energy to an AC motor 14. The AC motor 14 uses said AC electrical energy to supply mechanical energy to the mechanical system 16 and to an AC power output connector 13a. It is contemplated that a user of the portable power station system 10 can selectively activate or deactivate the brushless DC motor 12 or the AC motor 14 so as to have either or both running at a given time.

The DC power output connector 11a is configured to provide DC electrical energy from the battery 11 and supply it to an electrical outlet accessible from the exterior of the portable power station system 10 housing so as to allow a user to supply such DC electrical energy to an external device by connecting the external device to the DC power output connector 11a. The AC power output connector 13a is configured to provide AC electrical energy from to an electrical outlet accessible from the exterior of the portable power station system 10 housing so as to allow a user to supply such AC electrical energy to an external device by connecting the external device to the AC power output connector 13a The mechanical system 16 operates as a conventional gear or pulley system, in concert with a mechanical output attachment 16a, to take the mechanical energy provided to it and act to change the speed, torque, or direction of the energy in a desired manner. It is contemplated that a plurality of differing compatible mechanical output attachments 16a can be adapted to dock with the mechanical system 16 and change the speed, torque, or direction of the gear movement. In one embodiment, the mechanical output attachment 16a is defined as a larger compatible gear system which increases the torque of the mechanical system 16 movement. In other embodiments, the mechanical output attachment 16a is defined as a rack system which increases changes the rotation movement of the mechanical system 16 from rotation to translation. The mechanical output attachment 16a can then be mechanically connected to another device which desires produced mechanical energy.

The mechanical system 16 also provides mechanical energy to an alternator 18, defined as an AC electric generator. The alternator 18 coverts mechanical energy from the mechanical system 16 to AC electrical energy. This AC electrical energy is supplied to a rectifier 19, where it is converted to DC electrical energy, and then to a reservoir capacitor 20, to produce steady DC electrical energy from a rectified AC electrical energy supply. This DC electrical energy is then routed from the reservoir capacitor 20 a charge controller mechanism 21 which controls the charging of the battery 11 so as to assist in recharging the battery 11.

In one embodiment, the charge controller mechanism 21, is defined by a plurality of discrete charge controllers, each of which is connected to a supply of DC electrical energy. As such, the charge controller mechanism 21 is additionally connected to a solar power generator 22, defined as a solar panel and a wind power generator 23. The electrical energy generated from the alternator 18, solar power generator 22, and the wind power generator 23 is used to recharge the battery 11. In some embodiments, the solar power generator 22 is used in the alternative to the wind power generator 23. In other embodiments, the wind power generator 23 is used in the alternative to the solar power generator 22.

The portable power station system 10 housing additionally includes isolated ground 24 and a ground chassis 25 to allow for proper grounding of the electrical power flowing through it.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable power station system, comprising:
    a housing having at least one battery, a brushless DC motor, an inverter, a mechanical system, an AC motor, an alternator, and a charge controller mechanism which are sequentially connected disposed inside said housing, wherein said charge controller mechanism is connected to said battery;
    a solar power generator connected to said charge controller mechanism;
    wherein said housing additionally includes a ground chassis and an isolated ground;
    wherein said battery is configured to supply stored DC electrical energy to said brushless DC motor, said inverter, and a user output accessible from the exterior of said housing, said inverter is configured to supply AC electrical energy to said AC motor and a user output accessible from the exterior of said housing, said brushless DC motor and said AC motor are configured to supply mechanical energy to said mechanical system, said mechanical system is configured to supply mechanical energy to said alternator and to a mechanical output attachment positioned on the exterior of said housing, said alternator is configured to supply electrical energy to said charge controller mechanism, said solar power generator is configured to supply electrical energy to said charge controller mechanism, and said charge controller mechanism is configured to supply energy to said battery; and
    wherein said mechanical output attachment is adapted to change the speed, torque, or direction of the mechanical energy supplied thereto and direct the mechanical energy of the mechanical output attachment to a mechanically connected exterior device.

2. The portable power station system of claim 1, additionally comprising a wind power generator connected to the charge controller mechanism, wherein said wind power generator is configured to supply electrical energy to said charge controller mechanism.

3. The portable power station system of claim 1, wherein:
    said housing additionally includes a rectifier and a reservoir capacity; and
    said alternator is configured to direct electrical energy to the rectifier and reservoir capacitor before it is supplied to said charge controller mechanism.

4. The portable power station system of claim 1, wherein said solar power generator is defined as a at least one solar panel.

5. The portable power station system of claim 1, wherein the mechanical system is defined by at least one gear.

6. The portable power station system of claim 1, wherein the mechanical system is defined by at least one pulley.

7. A portable power station system, comprising:
    a housing having at least one super capacitor, a brushless DC motor, an inverter, a mechanical system, an AC motor, an alternator, and a charge controller mechanism which are sequentially connected disposed inside said housing, wherein said charge controller mechanism is connected to said super capacitor;
    a solar power generator connected to said charge controller mechanism;
    wherein said housing additionally includes a ground chassis and an isolated ground;
    wherein said super capacitor is configured to supply stored DC electrical energy to said brushless DC motor, said inverter, and a user output accessible from the exterior of said housing, said inverter is configured to supply AC electrical energy to said AC motor and a user output accessible from the exterior of said housing, said brushless DC motor and said AC motor are configured to supply mechanical energy to said mechanical system, said mechanical system is configured to supply mechanical energy to said alternator and to a mechanical output attachment positioned on the exterior of said housing, said alternator is configured to supply electrical energy to said charge controller mechanism, said solar power generator is configured to supply electrical energy to said charge controller mechanism, and said charge controller mechanism is configured to supply energy to said super capacitor; and
    wherein said mechanical output attachment is adapted to change the speed, torque, or direction of the mechanical energy supplied thereto and direct the mechanical energy of the mechanical output attachment to a mechanically connected exterior device.

8. The portable power station system of claim 7, additionally comprising a wind power generator connected to the charge controller mechanism, wherein said wind power generator is configured to supply electrical energy to said charge controller mechanism.

9. The portable power station system of claim 7, wherein:
said housing additionally includes a rectifier and a reservoir capacity; and
said alternator is configured to direct electrical energy to the rectifier and reservoir capacitor before it is supplied to said charge controller mechanism.

10. The portable power station system of claim 7, wherein said solar power generator is defined as a at least one solar panel.

11. The portable power station system of claim 7, wherein the mechanical system is defined by at least one gear.

12. The portable power station system of claim 7, wherein the mechanical system is defined by at least one pulley.

13. A method for providing access to electrical power and mechanical energy in from stored and renewable sources, comprising the steps of:
providing a portable power station having access to a device having stored DC electrical energy and a device adapted to generate electricity from a renewable source;
supplying said stored DC electrical energy to a device which converts DC electrical energy to mechanical energy;
supplying said stored DC electrical energy to a user output accessible from the exterior of said portable power station;
supplying mechanical energy to a device which converts mechanical energy to electrical energy;
supplying said mechanical energy to a mechanical output attachment positioned on the exterior of said portable power station, wherein said mechanical output attachment is adapted to change the speed, torque, or direction of the mechanical energy supplied thereto and direct the mechanical energy of the mechanical output attachment to a mechanically connected exterior device;
supplying electrical energy from said device which converts mechanical energy into electrical energy to said device having stored DC electrical energy; and
supplying electrical energy from said device adapted to generate electricity from a renewable source to said device having stored DC electrical energy.

14. The method of claim 13, additionally comprising the steps of:
supplying said stored DC electrical energy to a device which changes DC to AC;
supplying AC electrical energy to a device which converts DC electrical energy to mechanical energy; and
supplying AC electrical energy to a user output accessible from the exterior of said portable power station.

15. The method of claim 13, wherein the said device adapted to generate electricity from a renewable source comprises a wind power generator.

16. The method of claim 13, wherein the said device adapted to generate electricity from a renewable source comprises a solar power generator.

17. The method of claim 13, wherein at least one gear is utilized to supply mechanical energy to the device which converts mechanical energy to electrical energy and the mechanical output attachment.

18. The method of claim 13, wherein at least one pulley is utilized to supply mechanical energy.

* * * * *